United States Patent
Anang et al.

(10) Patent No.: US 11,603,129 B1
(45) Date of Patent: Mar. 14, 2023

(54) VEHICLE KNUCKLE

(71) Applicants: KABUSHIKI KAISHA RIKEN, Tokyo (JP); HONDA MOTOR CO., LTD., Tokyo (JP)

(72) Inventors: Cakrawala Anang, Tokyo (JP); Tadaaki Kanbayashi, Tokyo (JP); Norikazu Kurosu, Tokyo (JP)

(73) Assignees: KABUSHIKI KAISHA RIKEN, Tokyo (JP); HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 17/904,135

(22) PCT Filed: Nov. 26, 2020

(86) PCT No.: PCT/JP2020/044102
§ 371 (c)(1),
(2) Date: Aug. 12, 2022

(87) PCT Pub. No.: WO2021/161618
PCT Pub. Date: Aug. 19, 2021

(30) Foreign Application Priority Data

Feb. 12, 2020 (JP) .............................. JP2020-021637

(51) Int. Cl.
*B62D 7/18* (2006.01)
*B60G 15/07* (2006.01)

(52) U.S. Cl.
CPC ............... *B62D 7/18* (2013.01); *B60G 15/07* (2013.01)

(58) Field of Classification Search
CPC ............. B62D 7/18; B62D 7/16; B60G 15/00
(Continued)

(56) References Cited

U.S. PATENT DOCUMENTS

| 4,627,667 A | 12/1986 | Mahnig et al. |
| 6,398,240 B1 * | 6/2002 | Taylor ................ B60T 1/065 |
| | | 280/93.511 |

(Continued)

FOREIGN PATENT DOCUMENTS

| CN | 114932949 A | * | 8/2022 |
| EP | 1314630 A2 | | 5/2003 |

(Continued)

OTHER PUBLICATIONS

Aug. 11, 2022, International Preliminary Report on Patentability issued in the International Patent Application No. PCT/JP2020/044102.

(Continued)

*Primary Examiner* — Toan C To
(74) *Attorney, Agent, or Firm* — Kenja IP Law PC

(57) ABSTRACT

A vehicle knuckle 1 includes a main body 10, a strut junction 11 that is positioned at a first side in an extending direction of an axle supported by the main body and fastens a strut damper, and an arm 12 that couples the main body to the strut junction. The vehicle knuckle has a continuous space 17 formed inside the strut junction and the arm. The arm has a first through-hole 17a on a wall 12a that couples an end 10d at the first side of the main body to the strut junction. The first through-hole is formed, with being adjacent to the end at the first side, at the side of the main body with respect to the center of a coupling position of the wall and the main body and a coupling position of the wall and the strut junction and is communicated with the space.

14 Claims, 6 Drawing Sheets

(58) Field of Classification Search
USPC .................................................. 280/93.512
See application file for complete search history.

(56) References Cited

U.S. PATENT DOCUMENTS

| | | | | |
|---|---|---|---|---|
| 2005/0067805 A1* | 3/2005 | Kim | ..................... | B62D 7/18 280/93.512 |
| 2014/0027994 A1* | 1/2014 | Varela | ..................... | B62D 7/18 280/93.512 |
| 2017/0210418 A1* | 7/2017 | Sakuma | ............ | B29C 66/72141 |
| 2021/0024127 A1* | 1/2021 | Foti | ..................... | F16C 11/0652 |

FOREIGN PATENT DOCUMENTS

| | | | |
|---|---|---|---|
| JP | S5682668 | A | 7/1981 |
| JP | 2001114127 | A | 4/2001 |
| JP | 2001187583 | A | 7/2001 |
| JP | 2012143788 | A | 8/2012 |
| JP | 2016052810 | A | 4/2016 |
| JP | 2016088116 | A | 5/2016 |
| JP | 2017100484 | A | 6/2017 |
| JP | 2017217970 | A | 12/2017 |
| JP | 2017537016 | A | 12/2017 |
| WO | 2019113331 | A1 | 6/2019 |
| WO | 2020209376 | A1 | 10/2020 |

OTHER PUBLICATIONS

Feb. 9, 2021, International Search Report issued in the International Patent Application No. PCT/JP2020/044102.

Mar. 8, 2022, Decision to Grant a Patent issued by the Japan Patent Office in the corresponding Japanese Patent Application No. 2020-021637.

Nov. 30, 2021, Notification of Reasons for Refusal issued by the Japan Patent Office in the corresponding Japanese Patent Application No. 2020-021637.

Dec. 28, 2022, Office Action issued by the China National Intellectual Property Administration in the corresponding Chinese Patent Application No. 202080096293.1.

* cited by examiner

VEHICLE KNUCKLE

TECHNICAL FIELD

This disclosure relates to a vehicle knuckle, and in particular to a vehicle knuckle that can achieve weight reduction in an arm and maintenance of rigidity.

BACKGROUND

As a conventional vehicle knuckle, for example, PTL 1 discloses an integrally formed automobile knuckle.

CITATION LIST

Patent Literature

PTL 1: JP2001-187583A

SUMMARY

Technical Problem

It is preferable that a vehicle knuckle is light to reduce the weight of a vehicle and it is also preferable that the vehicle knuckle has high rigidity in that it has a function to support the axle.

In the weight reduction of the vehicle knuckle, an arm positioned between a strut junction fastened to a strut damper and a main body on which the axle is mounted is larger than the other portions of the vehicle knuckle, thus having room for the weight reduction. However, when the vehicle knuckle is used with being mounted on the vehicle, stress loading such as bending and torsion is largely applied to the arm, so the arm is required to have enough strength and rigidity. For example, when the arm of the knuckle is made hollow by casting, if an opening of the hollow portion is formed at the center or on the side surface of the arm (surface positioned in a direction vertical to a virtual surface including the axis of the axle and the axis of the strut damper), the strength and the rigidity may be insufficient for the stress loading.

In consideration of the above problem, it could be helpful to provide a vehicle knuckle that can achieve weight reduction in an arm and maintenance of rigidity.

Solution to Problem

A vehicle knuckle of this disclosure includes: a main body that supports an axle; a strut junction that is positioned at a first side in an extending direction of the axle supported by the main body, with respect to the main body and fastens a strut damper; and an arm that couples the main body to the strut junction. The vehicle knuckle has a continuous space formed inside the strut junction and the arm. The arm has a first through-hole on a wall that couples an end at the first side of the main body to the strut junction. The first through-hole is formed, with being adjacent to the end at the first side of the main body, at the side of the main body with respect to the center of a coupling position of the wall and the main body and a coupling position of the wall and the strut junction. The first through-hole is communicated with the space.

In the above configuration, it is preferable that the first through-hole is formed including a coupling position of the end at the first side of the main body and the wall.

In the above configuration, it is preferable that the strut junction includes a first wall positioned at the first side, and a second wall positioned at a side opposite to the first wall with respect to a hollow portion of the arm, and the strut junction has a second through-hole communicated with the space, on the second wall.

In the above configuration, it is preferable that the strut junction has a third through-hole communicated with the space, on a first wall positioned at the first side.

In the above configuration, it is preferable that the strut junction has two bolt holes for fixing the strut damper, and the second through-hole and the third through-hole are formed in a direction coupling the centers of the two bolt holes, in the range of a segment coupling the centers of the two bolt holes.

In the above configuration, the first through-hole, the second through-hole, and the third through-hole may be formed such that at least parts of the widths in a direction perpendicular to the extending direction of the axle, which is an upper and lower direction where the strut junction is positioned with respect to the main body, and a right and left direction perpendicular to the extending direction of the axle overlap one another.

In the above configuration, it is preferable that at least one of a first opening forming the first through-hole, a second opening forming the second through-hole, and a third opening forming the third through-hole has an R surface at at least an external side in cross-sectional view.

In the above configuration, it is preferable that the strut junction has a bolt hole for fixing the strut damper, and on a wall constituting the strut junction, the thickness at a part forming the bolt hole is thicker than the thickness at the other part of the wall.

In the above configuration, it is preferable that the vehicle knuckle includes two brake caliper junctions that fasten a brake caliper to the vehicle knuckle, and the first through-hole is formed in a direction coupling the centers of connection holes provided one on each of the two brake caliper junctions, in the range of a segment coupling the centers of the connection holes.

In the above configuration, it is preferable that among wall surfaces defining the space, a wall surface defining a boundary with the main body is formed as a taper closer to the axle toward the first side with respect to the extending direction of the axle, and the taper is inclined at 0.5° or more with respect to the extending direction of the axle.

Advantageous Effect

According to the present disclosure, a vehicle knuckle that can achieve weight reduction in an arm and maintenance of rigidity can be provided.

DETAILED DESCRIPTION

The following describes an example of one of the disclosed embodiments with reference to the drawings. In each drawing, identical components are marked with the same symbol. The embodiment described below is a preferable specific example of this disclosure and is therefore subject to various technically preferred limitations, but the scope of this disclosure is not limited to these aspects unless specifically stated to limit this disclosure in the following description.

Figure 1:
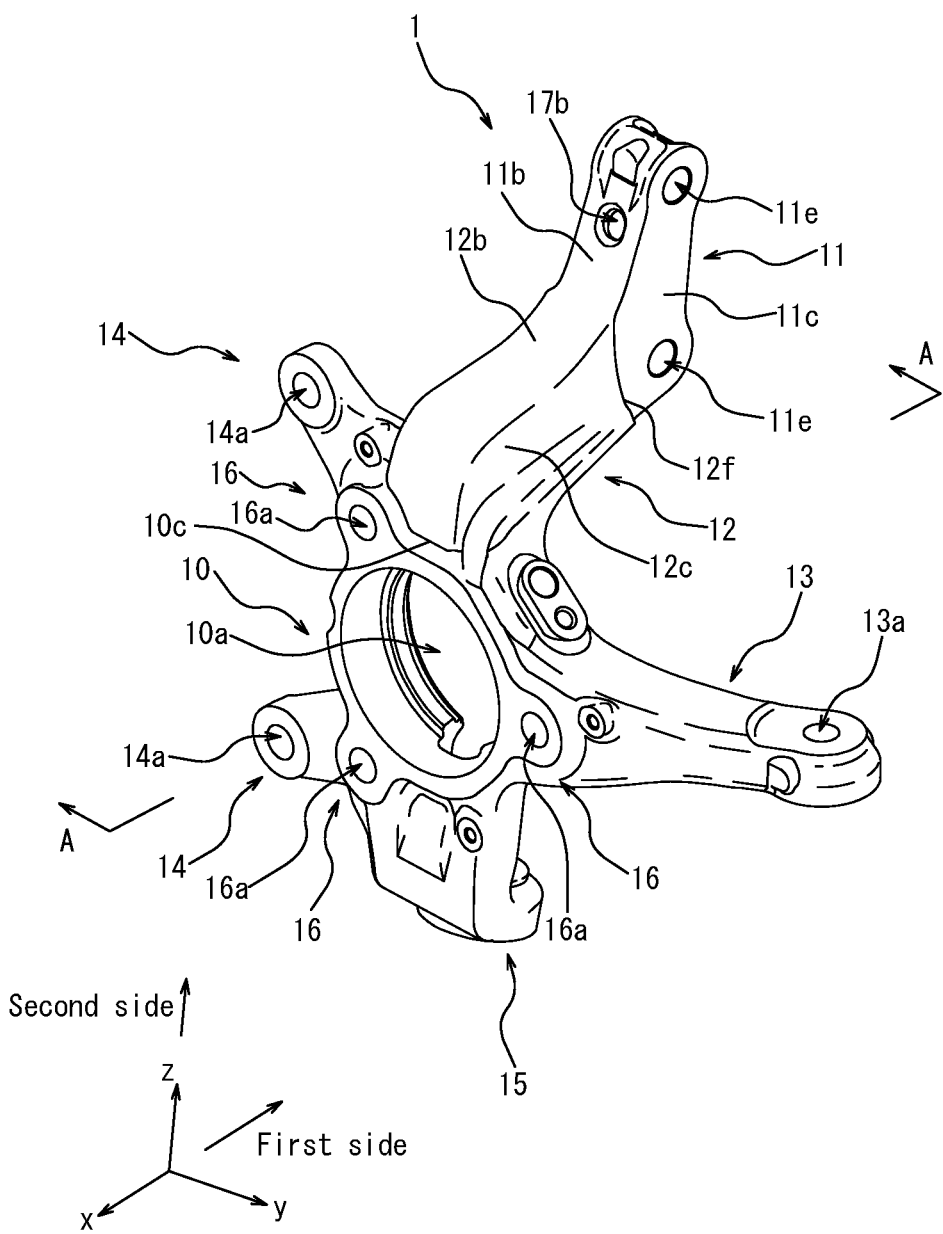
FIG. 1 is a perspective view illustrating one example of a vehicle knuckle according to one of the disclosed embodiments.
Figure 2:
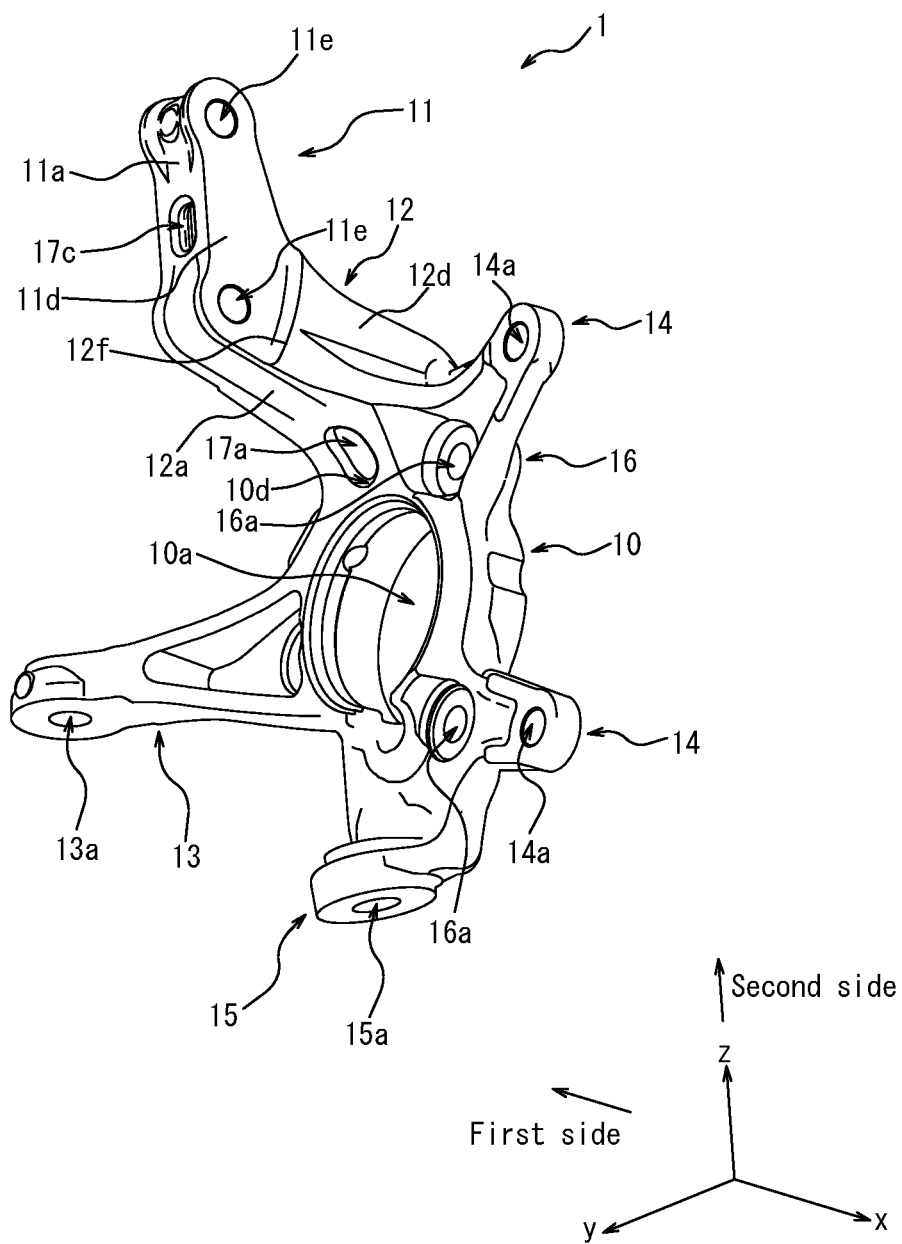
FIG. 2 is a perspective view when the vehicle knuckle in FIG. 1 is viewed from another direction.

FIG. 1 is a perspective view illustrating one example of a vehicle knuckle according to one of the embodiments. FIG. 2 is a perspective view when a vehicle knuckle 1 in FIG. 1 is viewed from another direction. Specifically, FIG. 2 is a perspective view when the vehicle knuckle 1 in FIG. 1 is viewed from a direction opposite to FIG. 1. FIG. 1 and FIG. 2 illustrate three-dimensional orthogonal coordinates by x-axis, y-axis, and z-axis.

As illustrated in FIG. 1 and FIG. 2, the vehicle knuckle 1 according to this disclosure is, for example, integrally formed to have an integral structure. The vehicle knuckle 1 is composed of, for example, metal such as iron or aluminum. The vehicle knuckle 1 is manufactured, for example, by casting. However, the vehicle knuckle 1 may be manufactured by another method including welding, processing, etc.

The vehicle knuckle 1 according to this disclosure includes a main body 10, a strut junction 11, an arm 12, a tie-rod junction 13, two brake caliper junctions 14, a lower-arm junction 15, and a plurality of (three in this disclosure) bearing junctions 16.

The main body 10 suspends the vehicle body by supporting an axle (not illustrated) of the vehicle. The main body 10 is formed in an annular shape having a central axis in the x-axis direction. The main body 10 has an axle hole 10a through which the axle passes. The axle hole 10a has a shape that is open in the x-axis direction (that is, through the main body 10 in the x-axis direction). The main body 10 suspends the vehicle body by supporting the axle at the axle hole 10a.

The strut junction 11 is a portion that fastens a strut damper 2 to the vehicle knuckle 1. In this embodiment, the strut junction 11 is positioned at a first side (in this embodiment, the side in the x-axis negative direction) of an extending direction of the axle supported by the main body 10 (that is, the x-axis direction in FIG. 1 and FIG. 2), with respect to the main body 10. In this embodiment, the first side of the extending direction of the axle means the side toward the center of the axle with respect to the main body 10. In addition, in this embodiment, the strut junction 11 is positioned at a second side away from the axle (in this embodiment, the side in the z-axis positive direction) of a direction perpendicular to the extending direction of the axle, with respect to the main body 10. In this embodiment, a direction (that is, the y-axis direction) perpendicular to the first side direction (that is, the extending direction of the axle, the x-axis direction) and the second side direction (that is, the z-axis direction) is also referred to as a right and left direction of the vehicle knuckle 1.

Figure 3:
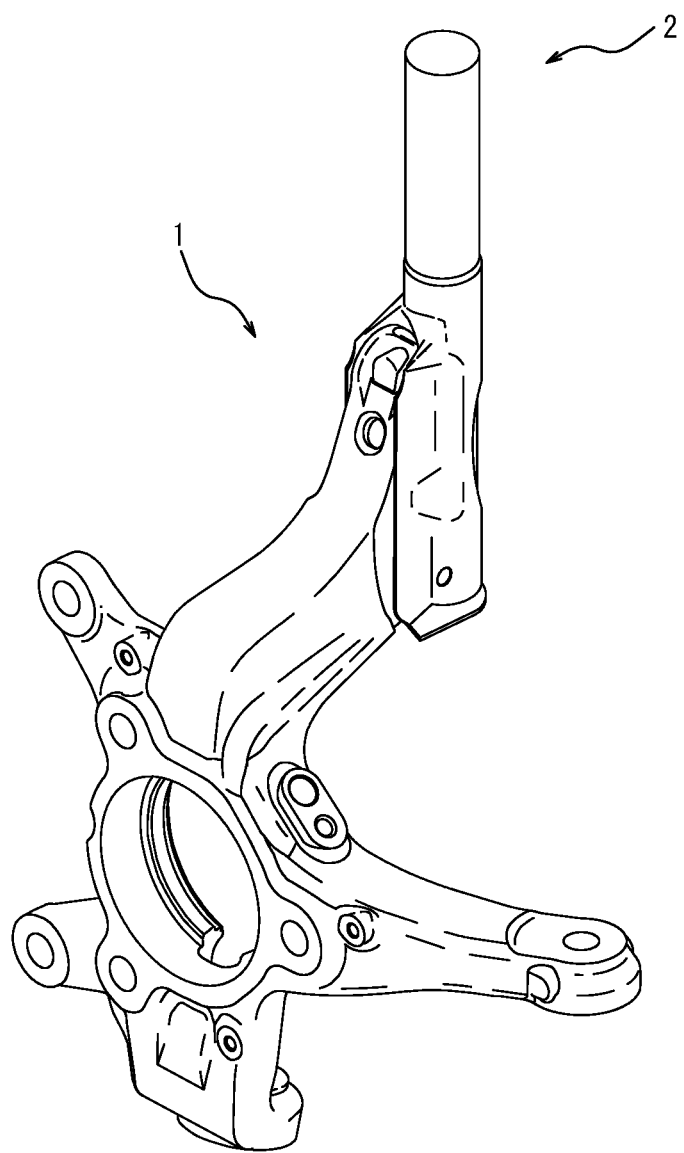
FIG. 3 is a perspective view illustrating a state where a strut damper is fastened to the vehicle knuckle in FIG. 1.

In this embodiment, the strut damper 2 is fastened to the vehicle knuckle 1 by sandwiching the strut junction 11 between parts of the strut damper 2 to fix the strut damper 2 to the strut junction 11. For example, as illustrated in FIG. 1 and FIG. 2, the strut junction 11 has two cylindrical bolt holes 11e each having a central axis in the y-axis direction. In this case, by sandwiching the strut junction 11 between the parts of the strut damper 2 and passing a bolt through the bolt hole 11e, as illustrated in FIG. 3 as one example, the strut damper 2 can be fixed to the vehicle knuckle 1.

The arm 12 is a portion that couples the main body 10 to the strut junction 11. At the coupling part of the strut junction 11 and the arm 12, the width of the arm 12 (length in the y-axis direction) is larger than the width of the strut junction 11. This makes an end 12f at the side in the x-axis negative direction of the arm 12 configured to have a width larger than the width of the strut junction 11 function as a regulator that regulates the fixed position of the strut damper 2 when mounting the strut damper 2 on the strut junction 11. The detail of the structures of the strut junction 11 and the arm 12 will be described later.

The tie-rod junction 13 is a portion that connects a tie rod to the vehicle knuckle 1. The tie-rod junction 13 is formed, for example, as a portion projecting in the y-axis direction from an approximate center in the z-axis direction of the main body 10. In the example illustrated in FIG. 1 and FIG. 2, the tie-rod junction 13 is formed as a portion projecting in the y-axis positive direction from the main body 10. The tie rod is connected to the vehicle knuckle 1 at a tie-rod connection hole 13a.

The brake caliper junction 14 is a portion that fastens a brake caliper to the vehicle knuckle 1. Two brake caliper junctions 14 are formed, for example, as portions each projecting to a side opposite to the tie-rod junction 13 in the y-axis direction, one from the end at the side in the z-axis positive direction and the other from the end at the side in the negative direction of the main body 10. In the example illustrated in FIG. 1 and FIG. 2, the brake caliper junctions 14 are formed as portions projecting in the y-axis negative direction from the main body 10. The brake caliper is fastened to the vehicle knuckle 1 at brake caliper connection holes 14a.

One brake caliper junction 14 has one brake caliper connection hole 14a. The vehicle knuckle 1 has one or more brake caliper connection holes 14a. As illustrated in FIG. 1 and FIG. 2, in this embodiment, the vehicle knuckle 1 has two brake caliper connection holes 14a.

The lower-arm junction 15 is a portion that connects a lower arm to the vehicle knuckle 1. The lower-arm junction 15 is formed, for example, as a portion projecting to the side in the z-axis negative direction from the end in the z-axis negative direction of the main body 10. The lower arm is connected to the vehicle knuckle 1 at a lower-arm connection hole 15a.

The bearing junction 16 is a portion that connects a bearing to the vehicle knuckle 1. A plurality of (in this embodiment, three) bearing junctions 16 are provided, for example, on the circumference of the annular main body 10. The bearing is connected to the vehicle knuckle 1 at bearing connection holes 16a.

Figure 4:
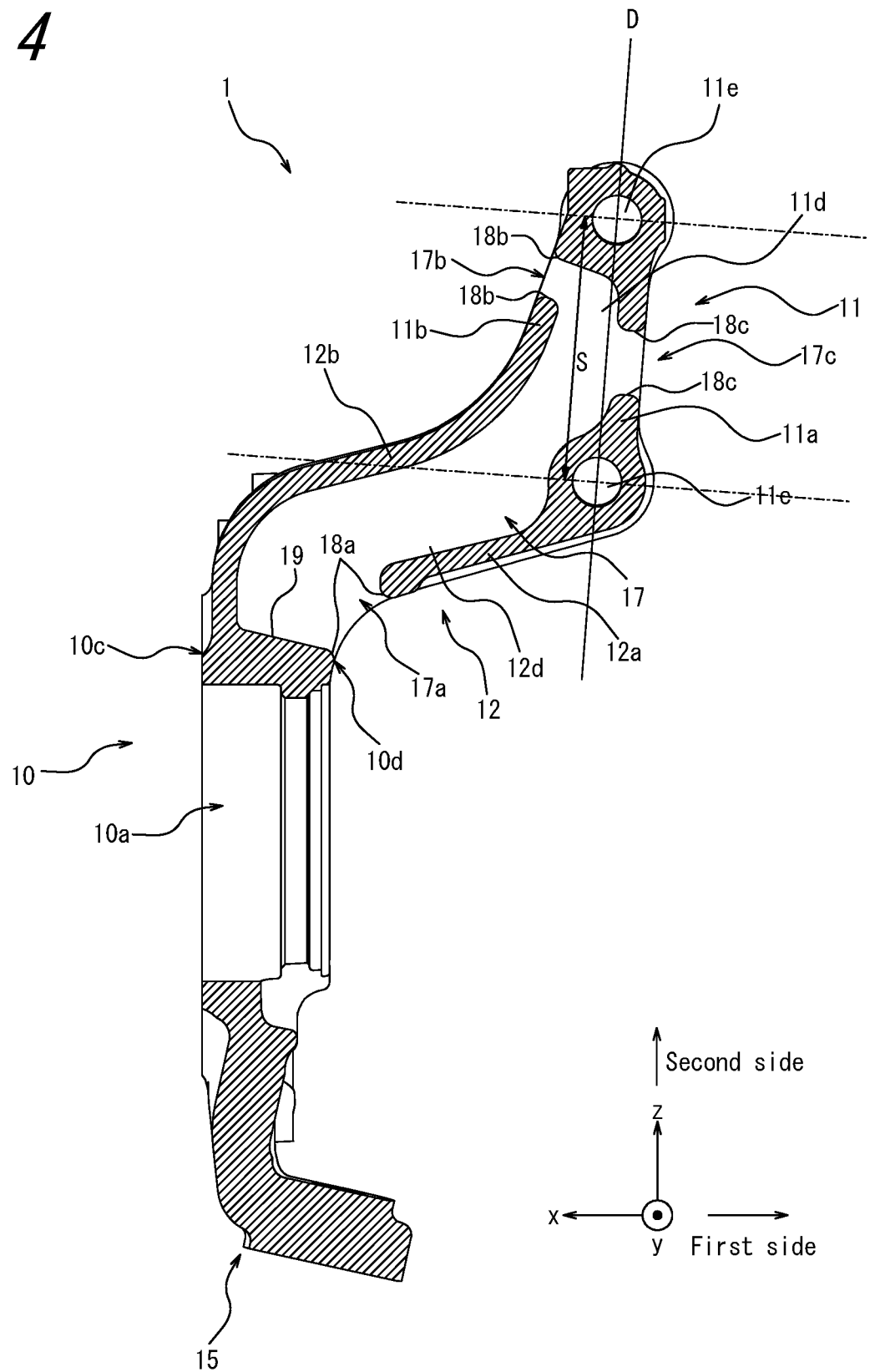
FIG. 4 is an A-A cross-sectional view of the vehicle knuckle in FIG. 1.

Next, referring to FIG. 1, FIG. 2, and FIG. 4, the detail of the structures of the strut junction 11 and the arm 12 will be described. FIG. 4 is an A-A cross-sectional view of the vehicle knuckle 1 in FIG. 1. Specifically, FIG. 4 is a cross-sectional view when the cross section of the vehicle knuckle 1 in the xz plane including the central axis of the annular main body 10 is viewed from the side in the y-axis positive direction.

As illustrated in FIG. 4, the strut junction 11 and the arm 12 have a continuous space 17 formed inside. That is, the space 17 is formed as one space, and the space 17 does not have walls, etc. that separate the space 17 to a plurality of parts. The space 17 reduces the weight of the vehicle knuckle 1.

In this embodiment, the arm 12 is formed having four walls. The arm 12 has an approximately rectangular cross section. Having an approximately rectangular cross section includes not only a case where the cross section is rectangular but also a case where the coupling parts of four sides in the cross section are smoothly formed, for example, by having curved surfaces. The four side surfaces divide the space 17 inside the arm 12 from the outside.

Specifically, the arm 12 is formed in a prismatic shape extending in an approximate x-axis direction. The arm 12 has a first wall 12a, a second wall 12b, a third wall 12c, and a fourth wall 12d as the four walls. The third wall 12c is a surface covering the side in the y-axis positive direction of the arm 12, and the fourth wall 12d is a surface covering the side in the y-axis negative direction of the arm 12. The second wall 12b is a surface covering the sides in the z-axis positive direction of the third wall 12c and the fourth wall 12d, and the first wall 12a is a surface covering the sides in the z-axis negative direction of the third wall 12c and the fourth wall 12d. The second wall 12b is coupled to an end 10c at the side in the x-axis positive direction and at the side in the z-axis positive direction of the main body 10, and the first wall 12a is coupled to an end 10d at the side in the x-axis negative direction (the first side) and at the side in the z-axis positive direction of the main body 10.

In this embodiment, the strut junction 11 is formed having four walls. These four walls divide the space 17 inside the strut junction 11 from the outside.

Specifically, the strut junction 11 is formed in an approximate prismatic shape extending in an approximate z-axis direction. The strut junction 11 has a first wall 11a, a second wall 11b, a third wall 11c, and a fourth wall 11d as the four walls. The third wall 11c is a surface covering the side in the y-axis positive direction of the strut junction 11, and the fourth wall 11d is a surface covering the side in the y-axis negative direction of the strut junction 11. The second wall 11b is a surface covering the sides in the x-axis positive direction of the third wall 11c and the fourth wall 11d, and the first wall 11a is a surface covering the sides in the x-axis negative direction of the third wall 11c and the fourth wall 11d.

The third wall 11c of the strut junction 11 and the third wall 12c of the arm 12 are formed as one continuous surface via the end 12f at the side in the x-axis negative direction of the arm 12. Similarly, the fourth wall 11d of the strut junction 11 and the fourth wall 12d of the arm 12 are formed as one continuous surface via the end 12f at the side in the x-axis negative direction of the arm 12.

The second wall 11b of the strut junction 11 is coupled to the second wall 12b of the arm 12 as a continuous surface with a gentle curved surface. Therefore, the second wall 12b of the arm 12 couples the end 10c at the side in the x-axis positive direction and at the side in the z-axis positive direction of the main body 10 to the second wall 11b of the strut junction 11. Further, the first wall 11a of the strut junction 11 is coupled to the first wall 12a of the arm 12 as a continuous surface with a gentle curved surface. Therefore, the first wall 12a of the arm 12 couples the end 10d at the side in the x-axis negative direction (the first side) and at the side in the z-axis positive direction of the main body 10 to the first wall 11a of the strut junction 11.

The strut junction 11 has the bolt holes 11e at the end in the z-axis positive direction and the end in the z-axis negative direction. The thickness at a part forming the bolt hole 11e is preferably configured to be thicker than the thickness at the other part. This other part includes, for example, the first wall 11a, the second wall 11b, the third wall 11c, and the fourth wall 11d. The thickness at the other part may be nearly uniform. Being nearly uniform means that the thickness is equal in the range of manufacturing error that occurs during manufacturing. Further, the thickness at this other part of the strut junction 11 may be nearly uniform with the thickness of each wall of the arm 12. Increasing the thickness at the part forming the bolt hole 11e can enhance the strength of the bolt hole 11e for fastening the strut damper 2. The thickness here refers to the thickness of the wall forming the strut junction 11, not the thickness including the bolt hole 11e.

The arm 12 has a first through-hole 17a that makes the space 17 communicate with the outside, on the first wall 12a. The first through-hole 17a is formed at the side of the main body 10 with respect to the center of the coupling position of the first wall 12a of the arm 12 and the main body 10 and the coupling position of the first wall 12a of the arm 12 and the strut junction 11. The coupling position of the first wall 12a of the arm 12 and the main body 10 is the end 10d at the side in the x-axis negative direction (the first side) and at the side in the z-axis positive direction of the main body 10 in the cross section illustrated in FIG. 4. The coupling position of the first wall 12a of the arm 12 and the strut junction 11 is defined by a segment coupling the ends in the z-axis negative direction of the end 12f of the third wall 12c and the fourth wall 12d in FIG. 1 and FIG. 2. The first through-hole 17a is particularly formed in its entirety, with being adjacent to the end 10d at the side in the x-axis negative direction (the first side) and at the side in the z-axis positive direction of the main body 10, at the side of the main body 10 with respect to the center of the coupling position of the first wall 12a of the arm 12 and the main body 10 and the coupling position of the first wall 12a of the arm 12 and the strut junction 11.

The first through-hole 17a is preferably, in particular, formed over an R portion formed by the main body and the first wall, including the coupling position of the end 10d at the side in the x-axis negative direction (the first side) and at the side in the z-axis positive direction of the main body 10 and the wall. In this way, by forming the first through-hole 17a, with being adjacent to the end 10d at the side in the x-axis negative direction (the first side) of the main body 10, at the side of the main body 10 with respect to the center of the coupling position of the first wall 12a of the arm 12 and the main body 10 and the coupling position of the first wall 12a of the arm 12 and the strut junction 11, compared with the case where the through-hole is formed at the side in the x-axis negative direction of the arm 12, the presence of the wall constituting the first wall 12a at the side in the x-axis negative direction of the arm 12 can receive the stress around the part connecting to the strut junction 11 of the arm 12 with the wide four-surface structure from the first wall to the fourth wall, thus maintaining the rigidity. In particular, the case where the first through-hole 17a is formed over the R portion formed by the main body and the first wall, including the coupling position of the end 10d at the side in the x-axis negative direction (the first side) of the main body 10 and the wall makes it easier to maintain the rigidity around the part connecting to the strut junction 11 of the arm 12. This can maintain the rigidity of the arm 12 while ensuring the communication with the space 17. Further, when holes are provided on the second wall 12b, the third wall 12c, and the fourth wall 12d, chill formation is likely to occur around these holes and the strength is likely to reduce, while when the first through-hole 17a is provided on the first wall 12a as in this embodiment, the shape effect makes the cooling rate slow to be less likely to cause the chill formation, thus making it easier to maintain the strength.

The vehicle knuckle 1 has the two brake caliper junctions 14 to which the brake caliper is fastened. The first through-hole 17a is formed in the direction coupling the centers of the brake caliper connection holes 14a provided one on each of the two brake caliper junctions 14 (that is, the z-axis direction in FIG. 1 and FIG. 2), in the range of a segment coupling the centers of the two brake caliper connection holes 14a. This can utilize the rigidity of the two brake caliper junctions 14 to reduce the reduction in the rigidity by the formation of the through-holes.

In this embodiment, the strut junction 11 further has a second through-hole 17b that makes the space 17 communicate with the outside, on the second wall 11b. In this embodiment, the strut junction 11 further has a third through-hole 17c that makes the space 17 communicate with the outside, on the first wall 11a. In this way, the vehicle knuckle 1 having a plurality of through-holes that makes the space 17 communicate with the outside, for example, when the vehicle knuckle 1 is painted by dipping it into the paint, can discharge air in the interior space 17 to the outside, thus reducing the occurrence of an unpainted part inside the space 17. The vehicle knuckle 1, even without a plurality of through-holes as in this embodiment, makes it easier to reduce the occurrence of an unpainted part inside the space 17 as long as it has the through-hole at at least one part.

The second through-hole 17b and the third through-hole 17c are preferably formed in a direction D coupling the two bolt holes 11e of the strut junction 11, in the range of a segment S coupling the centers of the two bolt holes 11e. FIG. 4 illustrates the direction D coupling the two bolt holes 11e of the strut junction 11 and the segment S coupling the centers of the two bolt holes 11e. The range of the segment S coupling the centers of the two bolt holes 11e is a range between two dashed lines intersecting both ends of the segment S in FIG. 4. The second through-hole 17b and the third through-hole 17c being formed in the direction D coupling the two bolt holes 11e of the strut junction 11, in the range of the segment S coupling the centers of the two bolt holes 11e can reduce the reduction in the strength of the knuckle to fasten the strut damper 2 to the vehicle knuckle 1 at the strut junction without interference from the through-hole.

Figure 5:
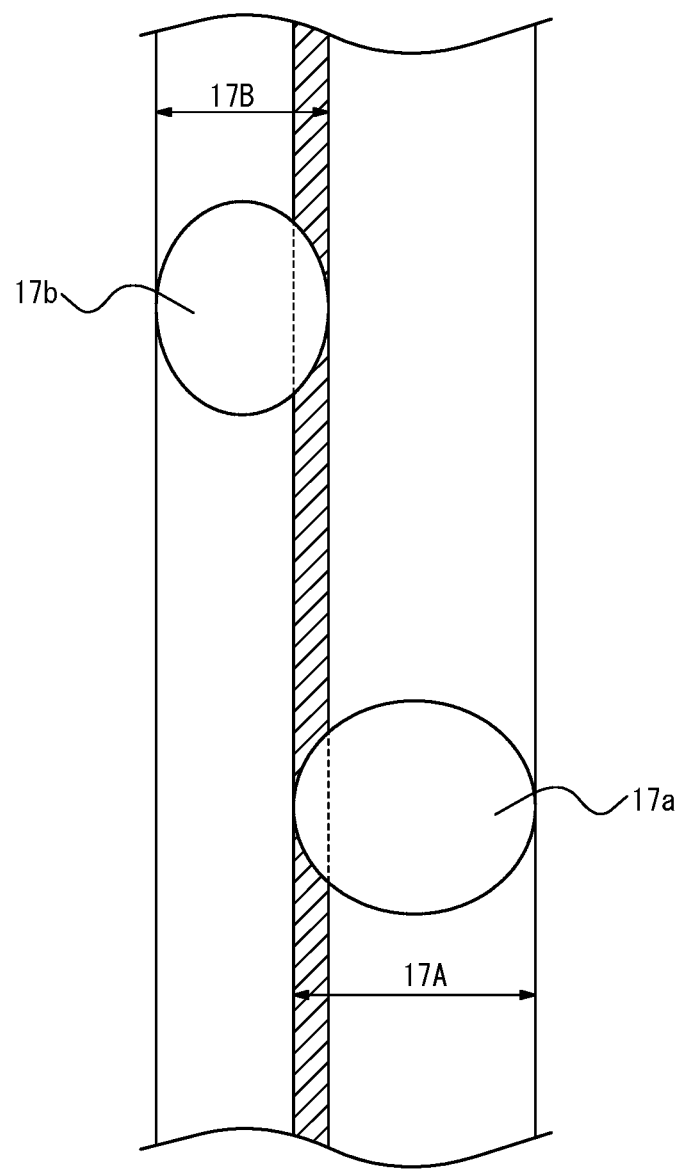
FIG. 5 is a schematic diagram illustrating a state where a part of the width of a first through-hole overlaps a part of the width of a second through-hole.

The first through-hole 17a, the second through-hole 17b, and the third through-hole 17c are formed such that at least parts of the widths in the right and left direction overlap one another. The right and left direction is the y-axis direction illustrated in FIG. 1 and FIG. 2, and the width in the right and left direction is the maximum width between the ends in the right and left direction of each of the first through-hole 17a, the second through-hole 17b, and the third through-hole 17c. For example, as schematically illustrated in FIG. 5, a width 17A in the right and left direction of the first through-hole 17a overlaps a width 17B in the right and left direction of the second through-hole 17b with a region indicated by the shaded line. As understood herein from FIG. 5, the width of the first through-hole 17a can also be thought of as a region between two virtual surfaces parallel to the xz plane, one of which contacting the right end and the other of which contacting the left end of the first through-hole 17a. The same applies to the second through-hole 17b and the third through-hole 17c. The first through-hole 17a, the second through-hole 17b, and the third through-hole 17c can also be formed on the identical plane along the xz plane. This plane may be a plane including the axle supported by the main body 10 and the axis of the strut damper 2 connected by the strut junction 11 (the axis in the extending direction). In this embodiment, as illustrated in FIG. 4, the first through-hole 17a, the second through-hole 17b, and the third through-hole 17c are all formed across the A-A cross section of the vehicle knuckle 1. The first through-hole 17a, the second through-hole 17b, and the third through-hole 17c are formed such that at least parts of the widths in the right and left direction overlap one another to avoid the stress concentration that occurs in the opening, thus making it easier to maintain the strength. The first through-hole 17a, the second through-hole 17b, and the third through-hole 17c are formed on the identical plane, thus making it further easier to maintain the strength. This plane is a plane including the axle supported by the main body 10 and the axis of the strut damper 2 connected by the strut junction 11 (the axis in the extending direction), thus making it further easier to maintain the strength.

The first through-hole 17a is formed by a first opening 18a, the second through-hole 17b is formed by a second opening 18b, and the third through-hole 17c is formed by a third opening 18c. At least one of the first opening 18a, the second opening 18b, and the third opening 18c has an R surface at at least the external side in cross-sectional view of this opening. The first opening 18a, the second opening 18b, and the third opening 18c may all have the R surface, for example, as illustrated in FIG. 4. In the example illustrated in FIG. 4, the first opening 18a, the second opening 18b, and the third opening 18c have the R surfaces not only at the external side but also at the internal side. The opening having the R surface in cross-sectional view can avoid the stress concentration that occurs at the first opening 18a, the second opening 18b, and the third opening 18c.

In the vehicle knuckle 1, among the wall surfaces defining the space 17, a wall surface 19 defining the boundary with the main body 10 is preferably formed as a taper closer to the axle toward the first side with respect to the extending direction of the axle. This taper is inclined at preferably 0.5° or more, and more preferably 1.5° or more, with respect to the extending direction of the axle. In this way, the wall surface 19 being formed as a taper and this taper being inclined at 0.5° or more with respect to the extending direction of the axle can certainly discharge water and excess paint that have entered in the space 17 of the knuckle. Water does not accumulate in the knuckle to reduce the occurrence of rust, thus making it easier to prevent the reduction in the strength and the rigidity. When the taper is inclined at 1.5° or more with respect to the extending direction of the axle, this effect will more increase.

In the above embodiment, the size of each through-hole can be appropriately determined according to, for example, the material, the shape, the size, and the thickness of the vehicle knuckle 1. For example, when the first through-hole 17a, the second through-hole 17b, and the third through-hole 17c have circular cross sections and the respective diameters are Ra, Rb, and Rc, it may be that Rb<Ra≤Rc.

This disclosure is not limited to the configurations specified in the above respective embodiments and, and various variations are possible within the range without departing from the scope of the claims.

Figure 6:
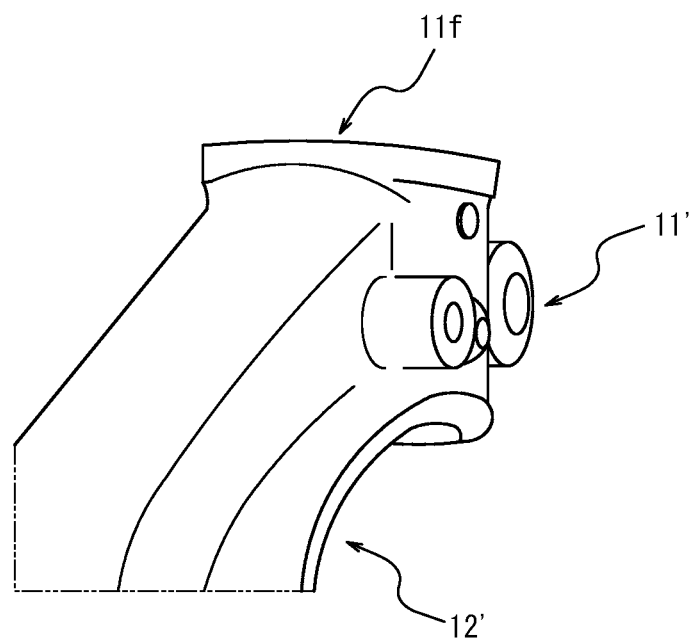
FIG. 6 is a schematic diagram illustrating another example of a strut junction of the vehicle knuckle.
Figure 7:
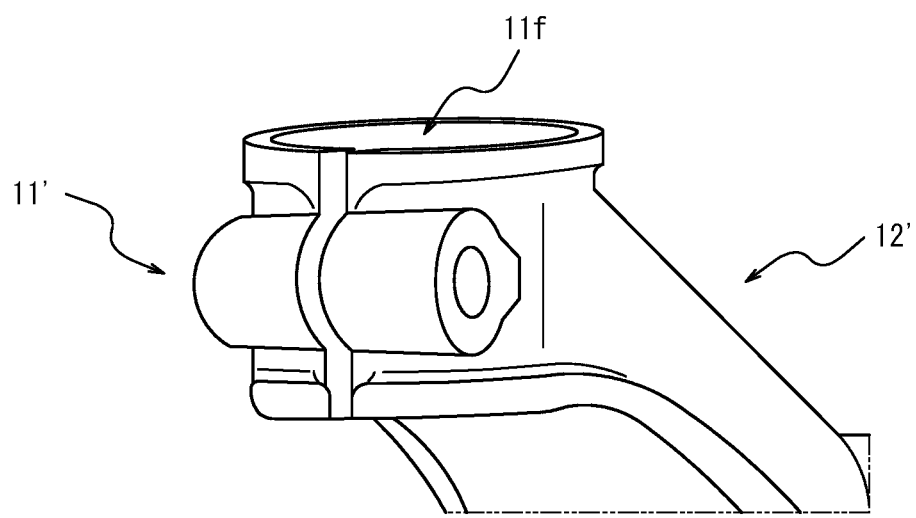
FIG. 7 is a schematic diagram when the strut junction illustrated in FIG. 6 is viewed from another direction.

For example, in the above embodiment, it is described that the strut damper 2 is fastened to the vehicle knuckle 1 by sandwiching the strut junction 11 between parts of the strut damper 2 to fix the strut damper 2 to the strut junction 11. However, the fixing method of the strut damper 2 by the strut junction 11 is not limited to this. For example, as schematically illustrated in FIG. 6 and FIG. 7, a strut junction 11' coupled to an arm 12' may have a strut shaft hole 11f through which the strut shaft of the strut damper passes. The strut shaft hole 11f has, for example, an open shape. In this case, the strut damper is connected to the vehicle knuckle 1, for example, by clamping the strut shaft in a state inserted through the strut shaft hole 11f.

INDUSTRIAL APPLICABILITY

This disclosure relates to a vehicle knuckle that can be used for an automobile and other various vehicles.

REFERENCE SIGNS LIST 1 vehicle knuckle
2 strut damper
10 main body
10a axle hole
10c, 10d, 12f end
11, 11' strut junction
11a, 12a first wall
11b, 12b second wall
11c, 12c third wall
11d, 12d fourth wall
11e bolt hole
11f strut shaft hole
12, 12' arm
13 tie-rod junction
13a tie-rod connection hole
14 brake caliper junction
14a brake caliper connection hole
15 lower-arm junction
15a lower-arm connection hole
16 bearing junction
16a bearing connection hole
17 space
17a first through-hole
17b second through-hole
17c third through-hole
18a first opening
18b second opening
18c third opening
19 wall surface

The invention claimed is:

1. A vehicle knuckle comprising:
a main body that supports an axle;
a strut junction that is positioned at a first side toward the center of the axle supported by the main body, with respect to the main body, the strut junction fastening a strut damper; and
an arm that couples the main body to the strut junction, wherein
the vehicle knuckle has a continuous space formed inside the strut junction and the arm,
the arm has a first through-hole on a wall that couples an end at the first side of the main body to the strut junction, the first through-hole being formed, with being adjacent to the end at the first side of the main body, at the side of the main body with respect to the center of a coupling position of the wall and the main body and a coupling position of the wall and the strut junction, and the first through-hole being communicated with the space,
the strut junction includes a first wall positioned at the first side, and a second wall positioned at a side opposite to the first wall with respect to a hollow portion of the arm,
the strut junction has a second through-hole communicated with the space, on the second wall,
the strut junction has a third through-hole communicated with the space, on a first wall positioned at the first side,
the strut junction has two bolt holes for fixing the strut damper, and
the second through-hole and the third through-hole are formed in a direction coupling the centers of the two bolt holes, in the range of a segment coupling the centers of the two bolt holes.

2. The vehicle knuckle according to claim 1, wherein the first through-hole, the second through-hole, and the third through-hole are formed such that at least parts of the widths in a direction perpendicular to the axis direction of the axle, which is an upper and lower direction where the strut junction is positioned with respect to the main body, and a right and left direction perpendicular to the axis direction of the axle overlap one another.

3. The vehicle knuckle according to claim 1, wherein at least one of a first opening forming the first through-hole, a second opening forming the second through-hole, and a third opening forming the third through-hole has an R surface at at least an external side in cross-sectional view.

4. The vehicle knuckle according to claim 1, wherein
on a wall constituting the strut junction, the thickness at a part forming the bolt hole is thicker than the thickness at the other part of the wall.

5. The vehicle knuckle according to claim 1, wherein among wall surfaces defining a boundary of the outer peripheral surface of the space, a wall surface defining a boundary with the main body is formed as a taper closer to the axle toward the first side with respect to the axle, and the taper is inclined at 0.5° or more with respect to the axle.

6. The vehicle knuckle according to claim 1, wherein the first through-hole is formed including a coupling position of the end at the first side of the main body and the wall of the arm.

7. The vehicle knuckle according to claim 1, comprising two brake caliper junctions that fasten a brake caliper to the vehicle knuckle, wherein
the first through-hole is formed in a direction coupling the centers of connection holes provided one on each of the two brake caliper junctions, in the range of a segment coupling the centers of the connection holes.

8. A vehicle knuckle comprising:
a main body that supports an axle;
a strut junction that is positioned at a first side toward the center of the axle supported by the main body, with respect to the main body, the strut junction fastening a strut damper; and
an arm that couples the main body to the strut junction, wherein
the vehicle knuckle has a continuous space formed inside the strut junction and the arm,
the arm has a first through-hole on a wall that couples an end at the first side of the main body to the strut junction, the first through-hole being formed, with being adjacent to the end at the first side of the main body, at the side of the main body with respect to the center of a coupling position of the wall and the main body and a coupling position of the wall and the strut junction, and the first through-hole being communicated with the space, and among wall surfaces defining a boundary of the outer peripheral surface of the space, a wall surface defining a boundary with the main body is formed as a taper closer to the axle toward the first side with respect to the axle, and the taper is inclined at 0.5° or more with respect to the axle.

9. The vehicle knuckle according to claim 8, wherein the strut junction includes a first wall positioned at the first side, and a second wall positioned at a side opposite to the first wall with respect to a hollow portion of the arm, the strut junction has a second through-hole communicated with the space, on the second wall, and the strut junction has a third through-hole communicated with the space, on a first wall positioned at the first side.

10. The vehicle knuckle according to claim 9, wherein the first through-hole, the second through-hole, and the third through-hole are formed such that at least parts of the widths in a direction perpendicular to the axis direction of the axle, which is an upper and lower direction where the strut junction is positioned with respect to the main body, and a right and left direction perpendicular to the axis direction of the axle overlap one another.

11. The vehicle knuckle according to claim 9, wherein at least one of a first opening forming the first through-hole, a second opening forming the second through-hole, and a third opening forming the third through-hole has an R surface at at least an external side in cross-sectional view.

12. The vehicle knuckle according to claim 8, wherein the strut junction has a bolt hole for fixing the strut damper, and on a wall constituting the strut junction, the thickness at a part forming the bolt hole is thicker than the thickness at the other part of the wall.

13. The vehicle knuckle according to claim 8, wherein the first through-hole is formed including a coupling position of the end at the first side of the main body and the wall of the arm.

14. The vehicle knuckle according to claim 8, comprising two brake caliper junctions that fasten a brake caliper to the vehicle knuckle, wherein the first through-hole is formed in a direction coupling the centers of connection holes provided one on each of the two brake caliper junctions, in the range of a segment coupling the centers of the connection holes.

\* \* \* \* \*